(12) United States Patent
Ota (10) Patent No.: US 8,324,551 B2
(45) Date of Patent: Dec. 4, 2012

(54) IMAGE READER PERFORMING IMAGE CORRECTION AT THE PIXEL LEVEL

(75) Inventor: Akira Ota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 281 days.

(21) Appl. No.: 12/828,567

(22) Filed: Jul. 1, 2010

(65) Prior Publication Data

US 2011/0233432 A1    Sep. 29, 2011

(30) Foreign Application Priority Data

Mar. 25, 2010    (JP) ................................ 2010-070163

(51) Int. Cl.
*H01L 27/00* (2006.01)
*H01L 31/00* (2006.01)
*G01N 21/86* (2006.01)
(52) U.S. Cl. .............. 250/208.1; 250/559.05; 250/214.1
(58) Field of Classification Search .............. 250/208.1, 250/214 R, 214.1, 559.04–559.07; 355/32, 355/133; 358/1.1, 1.9, 2.1, 2.99, 3.01, 1.14
See application file for complete search history.

(56) References Cited

U.S. PATENT DOCUMENTS 5,266,805 A * 11/1993 Edgar ........................... 250/330
6,979,834 B2 * 12/2005 Ochiai et al. ............. 250/559.42

FOREIGN PATENT DOCUMENTS

| JP | 10-276304 | 10/1998 |
|---|---|---|
| JP | 10-308901 | 11/1998 |
| JP | 2004-356933 | 12/2004 |
| JP | 2009-290771 | 12/2009 |

OTHER PUBLICATIONS

Japanese Office Action issued Feb. 14, 2012, in Japan Patent Application No. 2010-070163 (with English translation).

* cited by examiner

*Primary Examiner* — Pascal M Bui Pho
(74) *Attorney, Agent, or Firm* — Oblon, Spivak, McClelland, Maier & Neustadt, L.L.P.

(57) ABSTRACT

An image reader includes a first calculation unit for calculating an output value from an output value of a photodetector adjacent to a specific photodetector in read-width direction; a second calculation unit for calculating a ratio between a first value and a second value, the first value being an output value of the photodetector disposed in conveyance direction of the specific photodetector, and the second value being an output value of the photodetector adjacent, in the read-width direction, to the photodetector disposed in the conveyance direction of the specific photodetector; and a pixel correcting circuit that multiplies the values obtained by the first calculation unit and second calculation unit, substitutes the product for the output value at the pixel position of the photodetector specified by the pixel detecting circuit, and produces as a line output the substitute together with output values at pixel positions of the photodetectors not specified.

9 Claims, 5 Drawing Sheets

IMAGE READER PERFORMING IMAGE CORRECTION AT THE PIXEL LEVEL

BACKGROUND OF THE INVENTION

1. Field of the Invention

The present invention relates to an image reader for correcting a specific pixel.

2. Description of Related Art

As an image reader for reading a medium having two-dimensional information typified by a copying machine, the so-called line sensor is used in general. The line sensor, having a plurality of photoelectric conversion elements (photodetectors) in the read width direction (main scanning direction), has the number of pixels and pixel density which are determined in accordance with the read width, optical resolution or the performance of an optical system (imaging system) combined. As typical examples of line sensors, there are CCDs (Charge Coupled Devices) and photodiode arrays using CMOS process. Since they are all semiconductor devices, defectives can occur at a certain rate because of the influence of foreign substances during a manufacturing process. In the image reader that acquires a two-dimensional image with a line sensor by moving an object to be read, the defectives due to foreign substances and the like can cause line images not included in the original image. Accordingly, in addition to the technique of reducing the percent defective in the semiconductor manufacturing process, a technique for correcting pixel defects has been investigated as well.

For example, Japanese Patent Laid-Open No. 10-308901/1998 discloses in FIG. 2 (see Patent Document 1) a defect detecting correcting circuit which causes an address detecting circuit 24 to identify the address of a defective pixel within a screen from a defect signal extracted by a detector 22; stores the address data in an address storage circuit 25; generates, according to the address data provided from the address storage circuit 25, a defect correcting pulse at the timing the defective pixel is output, and interpolates pixel signals of neighboring pixels into the defective pixel.

Japanese Patent Laid-Open No. 2004-356933 discloses in Paragraph [0018] (see Patent Document 2) image processing which estimates pixel data of a missing pixel in photodetectors arranged in a line from pixel data of a plurality of photodetectors on both sides of the missing pixel, and outputs an image closer to the original document image.

Patent Document 1: Japanese Patent Laid-Open No. 10-308901/1998 (FIG. 2).

Patent Document 2: Japanese Patent Laid-Open No. 2004-356933 (Paragraph 0018).

SUMMARY OF THE INVENTION

However, the technique disclosed in Patent Document 1 has a problem of complicating the circuit configuration because it identifies the defect signal of the defective pixel in a CCD output by generating a correcting pulse.

The technique disclosed in Patent Document 2 has a problem of being inapplicable to sophisticated image processing such as color image processing because it estimates the pixel data of the missing pixel in the photodetectors arranged in a line according to the pixel data from the photodetectors on both sides of the missing pixel, and does not describe the photodetectors arranged in a plurality of lines.

The present invention is implemented to solve the foregoing problems. It is therefore an object of the present invention to provide an image reader with high reading accuracy by performing high fidelity correction on a specific pixel.

According to an image reader in accordance with the present invention, there is provided an image reader including first calculation means for calculating an output value from a photoelectric conversion output value of a photodetector adjacent to a specific photodetector in a read-width direction; second calculation means for calculating a ratio between a first value and a second value, the first value being an output value of a photodetector disposed in conveyance direction of the specific photodetector, and the second value being an output value of the photodetector adjacent, in the read-width direction, to the photodetector disposed in the conveyance direction of the specific photodetector; and a pixel correcting circuit that multiplies the values obtained by the first calculation means and second calculation means, substitutes the product for the output value at the pixel position of the photodetector specified by the pixel detecting circuit, and produces as a line output the substitute together with output values at pixel positions of the photodetectors not specified by the pixel detecting circuit.

According to an image reader in accordance with the present invention, it offers an advantage of being able to implement an image reader with high reading accuracy because using the data the pixels different from the specific pixel read, it forms an image signal of optical information to be read from the illuminated body by the specific pixel.

BRIEF DESCRIPTION OF THE DRAWINGS

FIG. 7 is a timing chart of an image reader in which FIG. 7($a$) shows RGB waveforms, and FIG. 7($b$) shows delayed RGB waveforms.

DETAILED DESCRIPTION OF THE PREFERRED EMBODIMENTS

Embodiment 1

Figure 1:
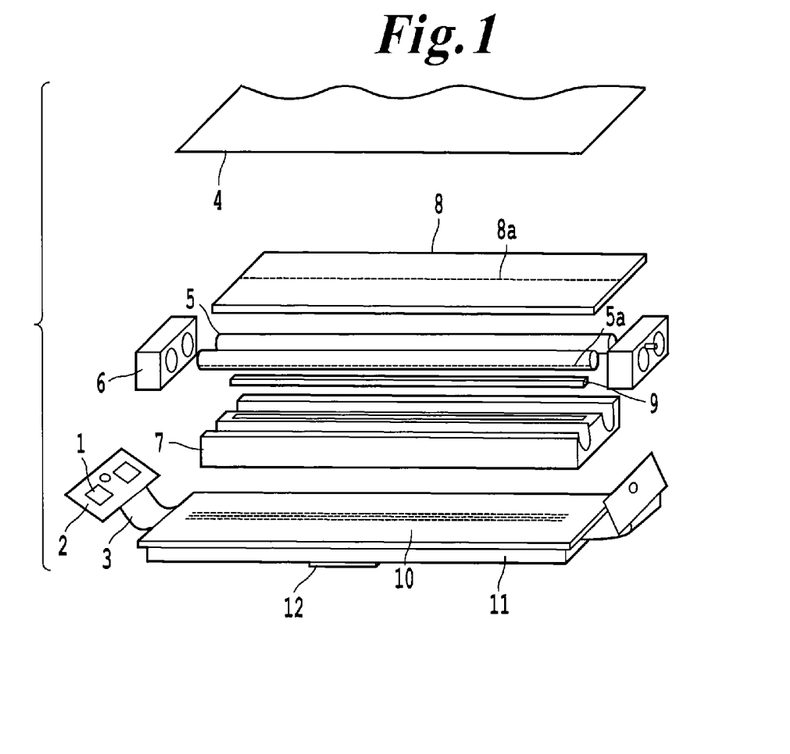
FIG. 1 is a development showing a construction of an image reader of an embodiment 1 in accordance with the present invention.

An embodiment 1 in accordance with the present invention will now be described with reference to FIG. 1. FIG. 1 is a development showing a construction of an image reader of the embodiment 1 in accordance with the present invention. In FIG. 1, the reference numeral 1 designates a light source which is a light emitting body such as an LED chip or general-purpose mold type LED. The reference numeral 2 designates a circuit board on which the light source 1 is mounted, and 3 designates a flexible circuit board which is fastened to the circuit board 2 for supplying power to the light source 1.

The reference numeral 4 designates an illuminated body such as a document or medium (also called an original); 5 designates a light-guiding body consisting of a transparent material such as a glass material or acrylic resin; 5a designates a light-scattering layer (light-reflecting layer) attached on the light-guiding body 5; and 6 designates a holder that has hollow portions in its inside, and has its first side disposed at the light source 1 and its second side fitted with the end of the light-guiding body 5 to be fixed. The reference numeral 7 designates a casing for storing or holding the light source 1 and the light-guiding body 5.

The reference numeral 8 designates a transmitting body which consists of a transparent material such as a glass or acrylic material for protecting the inside of the image reader; and 8a designates a reading position in the main scanning direction (read width direction) on the transmitting body 8, which is not a physical component. The reference numeral 9 designates a lens body using a rod lens array or the like, for receiving diffused light from the illuminated body 4 and for converging the diffused light to form an image.

The reference numeral 10 designates a sensor substrate consisting of a dielectric substrate such as a glass substrate, which is placed in the read width direction around the optical axis of the lens body 9 for receiving light converged through the lens body 9. The sensor substrate 10 includes many photodetectors (photoelectric converter sections) formed linearly on a surface of the dielectric substrate, and has a driving circuit including a shift register for driving the photodetectors, and a latch circuit and switches.

The reference numeral 11 designates a signal processing circuit board which carries out signal processing of the photoelectric conversion outputs of the photodetectors of the sensor substrate 10, and which has an external connector, electronic components, and a signal processing circuit mounted thereon. The reference numeral 12 designates a signal processing IC (ASIC) which is mounted on the signal processing circuit board 11 and constitutes the signal processing circuit. In the drawings, the same reference numerals designate the same or like portions.

Figure 2:
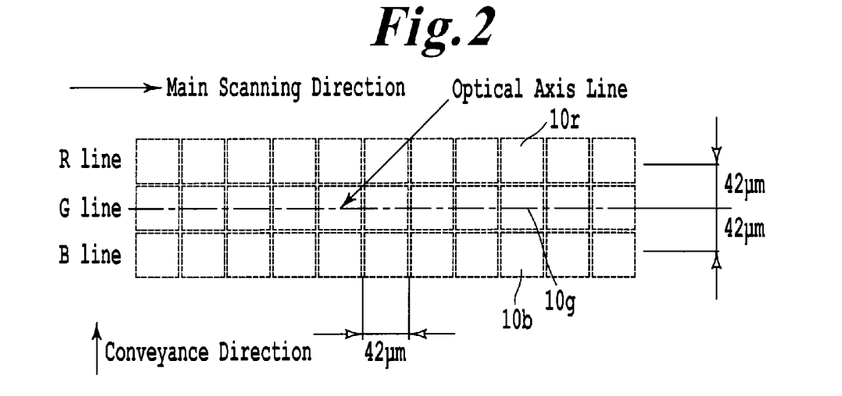
FIG. 2 is a plan showing photodetectors formed on a sensor substrate of the image reader of the embodiment 1 in accordance with the present invention.

FIG. 2 is a plan showing the photodetectors formed on the sensor substrate of the image reader of the embodiment 1 in accordance with the present invention. In FIG. 2, the sensor substrate 10 is provided with a plurality of photodetectors about the optical axis line of the lens body 9. The reference symbol 10r designates photodetectors having red filters formed on the photodetector surfaces; 10g designates photodetectors having green filters formed on the photodetector surfaces; and 10b designates photodetectors having blue filters formed on the photodetector surfaces. The photodetectors on the sensor substrate 10 are formed in such a manner that they are extended in the read width direction, and that the blue filter line (B line) and the red filter line (R line) are arranged on both sides of the green filter line (G line) placed on the optical axis line in the conveyance direction. Accordingly, the photodetectors 10b in the B line and the photodetectors 10r in the R line are placed at the same distance from the optical axis line at the center. As for the photodetectors with the pixel density of 600 dpi, the distance (D) between the photodetectors is about 42 μm, and they are placed in parallel to each other at that pitch. Thus, the individual photodetectors 10r, 10g and 10b are placed about 42 μm apart from each other in the sub-scanning direction.

Figure 3:
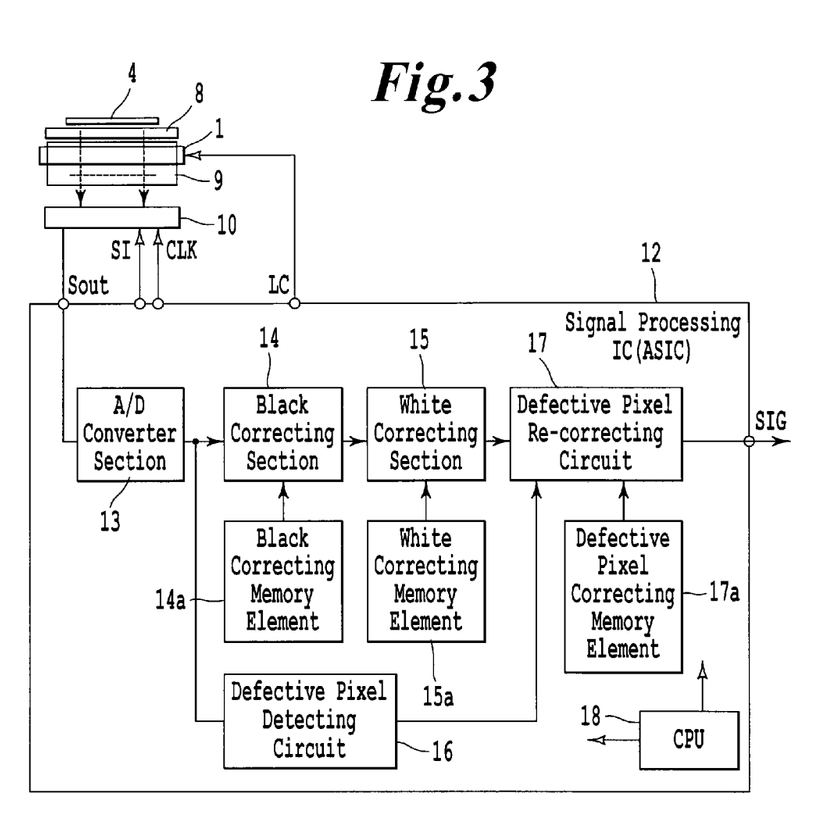
FIG. 3 is a block diagram of the image reader of the embodiment 1 in accordance with the present invention.

FIG. 3 is a block diagram of the image reader of the embodiment 1 in accordance with the present invention. The signal processing IC 12 includes an A/D converter section 13 for receiving the photoelectric conversion signals (photoelectric conversion output values) output from the photodetectors 10r, 10g and 10b and for converting the analog signals to digital signals by A/D conversion (analog to digital conversion); a black correcting section 14 for reducing variations in the black level of the individual pixels (photodetectors); a black correcting memory element (black correcting ROM) 14a for storing correcting values in advance which are used for the black level correction; a white correcting section 15 for reducing variations in the white level of the individual pixels (photodetectors); and a white correcting memory element (white correcting ROM) 15a for storing correcting values in advance which are used for the white level correction.

Furthermore, the signal processing IC 12 includes a defective pixel detecting circuit (pixel detecting circuit) 16 to which the photoelectric conversion signals divided from the output of the A/D converter section 13 is input; a defective pixel re-correcting circuit (pixel correcting circuit) 17 for applying re-correction processing to a defective pixel (pixel of a specific photodetector) detected by the defective pixel detecting circuit 16; a defective pixel correcting memory element (re-correction ROM) 17a for storing in advance the pixel position data on the defective pixel (pixel address of the specific photodetector) to be subjected to the data correction of the defective pixel; and a CPU 18 for controlling the operation of the signal processing IC 12. A series of operations receive instructions from the CPU 18 mounted on the ASIC 12.

Next, the operation will be described.

The light emitted from the light source 1 provided along the read width passes through the transmitting body 8, and irradiates the illuminated body 4 such as the original. The light reflected off the illuminated body 4 is converged through the lens body 9 having rod lenses arranged in the read width direction. The reflected light converged through the lens body 9 is received with many photodetectors 10r, 10g and 10b, and the received light undergoes photoelectric conversion. Thus, three analog signals (RGB output signals Sout) undergo digital conversion successively with the A/D converter section 13. A first group of the digital signals passing through the digital conversion undergoes shading correction of all the bits by the black correcting section 14 and white correcting section 14, and is output as a digital image signal (SIG). These operations undergo timing control according to a clock signal (CLK) delivered from the signal processing IC 12 or the main system and according to a start signal (SI) which is a line scanning signal linked to the clock signal.

A second group of the digital signals passing through the digital conversion undergoes the defective pixel detection by the defective pixel detecting circuit 16. The light source 1 is turned off in advance, and the output values of the individual photodetectors during the lights-out are detected. In addition, the output values of the individual photodetectors during lighting up of the light source 1 are detected. The acquisition of the data during the lighting up of the light source 1 is carried out as to the output values of the individual photodetectors while reading a white reference test chart or the like in advance. The defective pixel detecting circuit 16 measures the photoelectric conversion output values of the photodetectors 10r, 10g and 10b by setting as a threshold range a desired value range which is set by excluding the most significant bit and least significant bit of 8-bit resolution, for example, specifies a photodetector 10r, 10g or 10b having the photoelectric conversion output value less than the threshold range, and detects the pixel position of the specific photodetector 10r, 10g or 10b. Then it stores the data including the pixel position (address) corresponding to the photoelectric conversion output value less than the desired threshold range in the re-correction ROM 17a of the defective pixel re-correcting circuit 17.

The defective pixel re-correcting circuit 17 reads the specific pixel position data from the re-correction ROM 17a in accordance with the instruction of the CPU, generates the pixel signal at the position read out, and outputs it. Accordingly, the defective pixel re-correcting circuit 17 does not use the pixel signal that is delivered from the white correcting section 15 and corresponds to the specific pixel position. Thus, it generates a new output value to replace the output value, and outputs it together with the pixel data on the unspecific photodetector to the main system or the like as the image signal (SIG) of one line.

Figure 4:
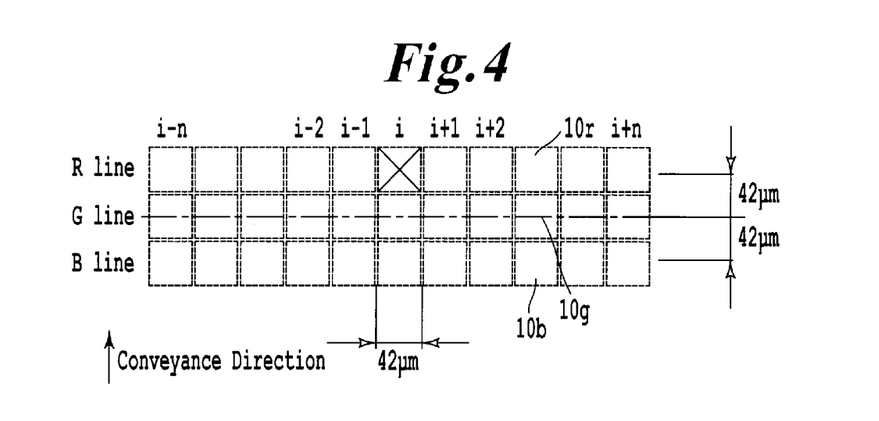
FIG. 4 is a plan showing pixel lines for explaining a defective pixel of the image reader of the embodiment 1 in accordance with the present invention.

Next, a correcting method (processing) of the defective pixel re-correcting circuit 17 of the image reader of the embodiment 1 in accordance with the present invention will be described. FIG. 4 is a plan showing pixel lines for explaining a defective pixel of the image reader of the embodiment 1 in accordance with the present invention. In FIG. 4, an example having a defect at an ith pixel (referred to as $R_i$ from now on) among the R line pixels will be described. To obtain the output estimation value of the defective pixel $R_i$, the defective pixel re-correcting circuit 17 obtains a temporary estimation value $VR'_i$ in terms of the value of a function of the output values of two adjacent pixels of the defective pixel $R_i$ on the pixel line (R line) including the defective pixel $R_i$, first.

For example, when the average value of the outputs of the adjacent pixels $R_{i-1}$ and $R_{i+1}$ of the defective pixel $R_i$ is used, the temporary estimation value $VR'_i$ is obtained by the following expression.

$$VR'_i = (VR_{i-1} + VR_{i+1})/2$$

Next, as to the pixels $G_i$ and $B_i$ which are placed on the pixel lines different from the defective pixel $R_i$ in the sub-scanning direction and at the same position as the $R_i$ in the main scanning direction, the defective pixel re-correcting circuit 17 obtains the temporary estimation values of the pixels $G_i$ and pixel $B_i$ using the same method as that applied to the defective pixel $R_i$. These expressions are referred to as a temporary estimation means 1 (first calculation means).

$$VG'_i = (VG_{i-1} + VG_{i+1})/2$$

$$VB'_i = (VB_{i-1} + VB_{i+1})/2$$

Ratios $\eta G_i$ and $\eta B_i$ between the temporary estimation value $VG'_i$ and temporary estimation value $VB'_i$ and actual output values $VG_i$ and $VB_i$ are defined as follows. These expressions are referred to as a temporary estimation means 2 (second calculation means).

$$\eta G_i = VG_i / VG'_i$$

$$\eta B_i = VB_i / VB'_i$$

The ratios can be considered as actually measured values of relative errors when applying the temporary estimation means for the defective pixel $R_i$ to the G line and B line.

Here, the $R_i$, $G_i$, $B_i$ pixel data are pixel data obtained by reading the same area of the illuminated body 4 like the original through color filters with different wavelengths, and hence have correlation with each other. Likewise, the ratio $\eta R_i$ (=$VR_i/VR'_i$) between the temporary estimation value $VR'_i$ for the defective pixel $R_i$ and the pixel data $VR_i$ to be obtained without a defect has correlation with the ratios $\eta G_i$ and $\eta B_i$.

Thus, by applying, according to the expressions of $\eta G_i$ and $\eta B_i$, re-correction to the temporary estimation value $VR'_i$ once obtained, a final estimation value $VR''_i$ more accurate than the temporary estimation value can be obtained. For example, using the average value of the foregoing $\eta G_i$ and $\eta B_i$ as an expression used for the re-correction, the defective pixel re-correcting circuit 17 multiplies the temporary estimation means 1 and the temporary estimation means 2 as shown below, and produces the result as the output value for the defective pixel $R_i$ after the correction (after data replacement).

$$VR''_i = VR'_i \times \{(\eta G_i + \eta B_i)/2\}$$

Since the $R_i$, $G_i$, $B_i$ pixel data are pixel data obtained by reading the same area of the original, the individual output values have correlations with each other. Likewise, the ratio (relative error) $\eta R_i$ (=$VR_i/VR'_i$) between the temporary estimation value $VR'_i$ for the defective pixel and the pixel data $VR_i$ to be obtained without a defect has correlation with the ratios $\eta G_i$ and $\eta B_i$.

In the same manner, $VG''_i$ for the defective pixel $G_i$ and $VB''_i$ for the defective pixel $B_i$ can be obtained. Incidentally, although the embodiment 1 employs the two adjacent photodetector data of the defective pixel in the read width direction, it can also use one of them. In addition, as for the temporary estimation means 1 and temporary estimation means 2, considering the characteristics of the photodetectors with different wavelengths, constants (coefficients) maintaining linearity can be added as values to be referred to.

Alternatively, although the embodiment 1 employs the photodetector data on both sides adjacent to the defective pixel in the read width direction, it is also possible to provide the photodetector data on both sides with coefficients weighted by considering the adjacent pixels on opposite sides of the defective pixel, and to use them as the temporary estimation means 1 and temporary estimation means 2.

As described above, according to the image reader of the embodiment 1 in accordance with the present invention, by applying the re-correction to the temporary estimation value $VR'_i$ according to the expression whose arguments are $\eta G_i$ and $\eta B_i$, it offers an advantage of being able to obtain the final estimation value $VR''_i$ more accurate than the temporary estimation value. As for $VG''_i$ for the defective pixel $G_i$ and $VB''_i$ for the defective pixel $B_i$, the same is true.

Embodiment 2

Figure 5:
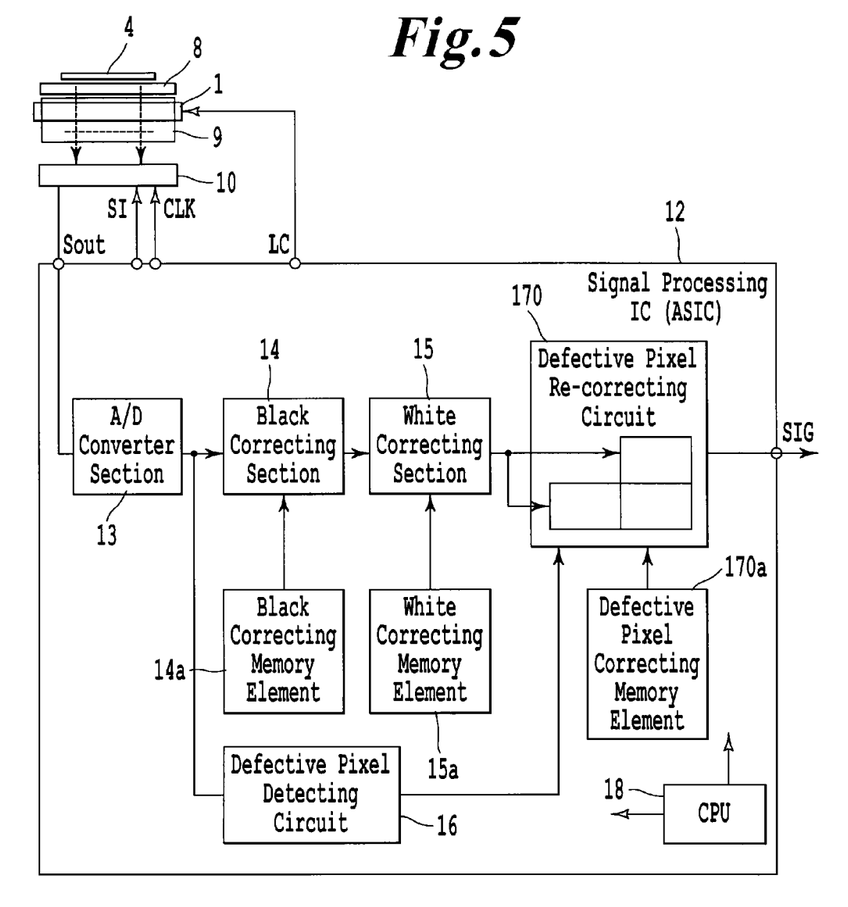
FIG. 5 is a block diagram of an image reader of an embodiment 2 in accordance with the present invention.

Although the embodiment 1 shows an example in which the defective pixel re-correcting circuit 17 performs the re-correction processing on the defective pixel detected by the defective pixel detecting circuit 16, the embodiment 2 will explain a method of carrying out more accurate image processing with reference to FIG. 5. FIG. 5 is a block diagram of an image reader of the embodiment 2 in accordance with the present invention. In FIG. 5, the reference numeral 170 designates a defective pixel re-correcting circuit for applying re-correction processing to the defective pixel detected by the defective pixel detecting circuit 16; and 170a designates a defective pixel correcting memory element (re-correction ROM) for storing in advance the pixel position data on a defective pixel to be subjected to the data correction of the defective pixel (pixel address of the specific photodetector). In FIG. 5, the same reference numerals as those of FIG. 3 designate the same or like portions. Since the remaining portions are the same as those shown in the embodiment 1, their description will be omitted here.

Figure 6:
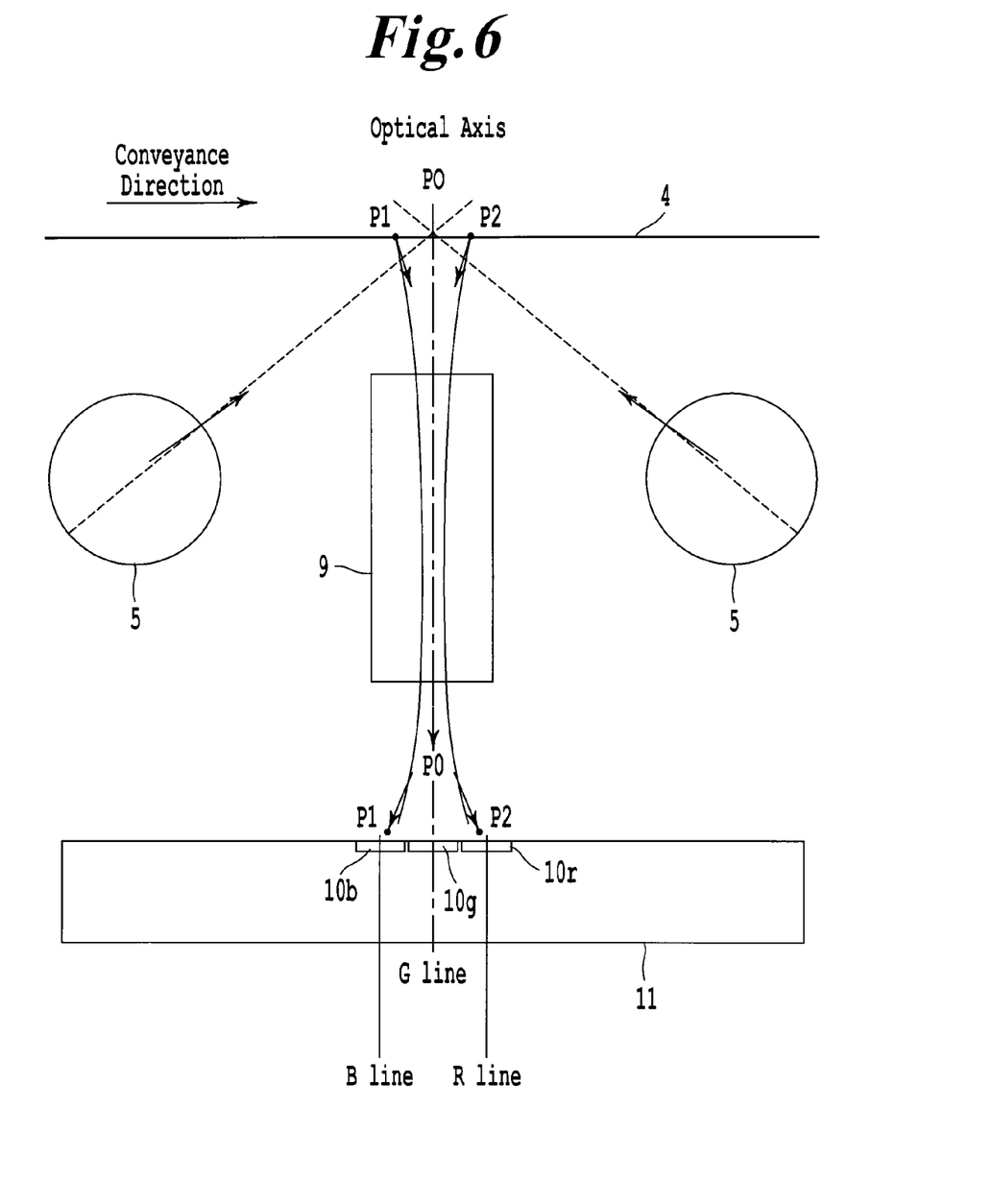
FIG. 6 is a cross section of an optical system portion to be mounted on the image reader.

FIG. 6 is a cross section of an optical system portion to be mounted on the image reader. In FIG. 6, points (P0-P3) on the surfaces of the photodetectors 10r, 10g and 10b have one-to-one correspondence with the points (P0-P3) on the illuminated body 4 via the lens body 9 in the optical axis direction. Thus, as for the pixels on the B line having the photodetectors 10b disposed on the sensor substrate 11, the pixels on the G line having the photodetectors 10g disposed and the pixels on the R line having the photodetectors 10r disposed, the areas to be read which correspond to those pixels differ from each other.

In the same manner as described above in the embodiment 1, assume that the arrangement density of the photodetectors 10r, 10g and 10b is 600 dpi in the conveyance direction, that the moving direction of the illuminated body 4 relative to the photodetectors 10r, 10g and 10b is B line→G line→R line of the photodetectors 10r, 10g and 10b, and that the amount of movement of the photodetectors 10r, 10g and 10b at one scanning period interval is set equal to the arrangement pitch so that the time period at which the areas corresponding to the pixels on the B line on the illuminated body 4 move onto the G line is the next scanning period (next line), and the time period at which the areas corresponding the pixels on the same B line move onto the R line is the third scanning period (third line).

Figure 7A:
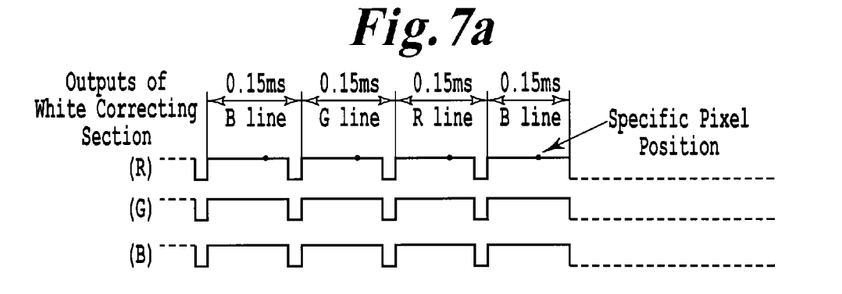

More specifically, as shown in the timing chart of FIG. 7(a), when the photodetectors 10b, 10g and 10r are disposed 42 µm apart in the conveyance direction, when the conveyance speed of the illuminated body 4 is 280 mm/sec, and when the speed of reading one section is 0.15 ms/line, the photoelectric conversion outputs of the photodetectors 10b, 10g and 10r are output simultaneously for the individual lines (RGB) after completing one scanning period.

Figure 7B:
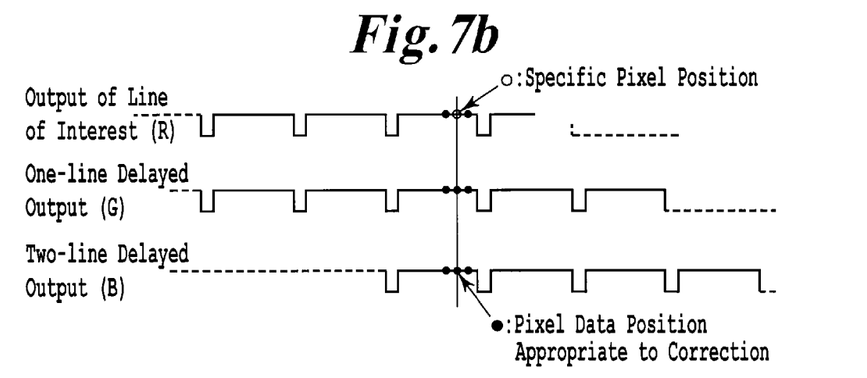

When paying attention to the defective pixel (specific pixel) $R_i$ on the R line, among the RGB signals simultaneously output as shown in FIG. 7(b), delaying the B line signal of the photodetectors 10b two scanning periods and the G line signal of the photodetectors 10g one scanning period with respect to the R line signal of the photodetectors 10r output from the white correcting section 15, and acquiring them make it possible to obtain the photoelectric conversion signals that read the same area of the illuminated body 4 through three color filters with different wavelengths, thereby being able to achieve the accuracy higher than the correcting accuracy described in the embodiment 1 by using the signals after the time adjustment. Thus, the defective pixel re-correcting circuit 170 processes the photodetector data on the G line delayed one line and corresponding to the specific pixel $R_i$ position, specific pixel $R_{i-1}$ position and specific pixel $R_{i+1}$ position, and the photodetector data on the B line delayed by two lines and corresponding to them.

Figure 8:
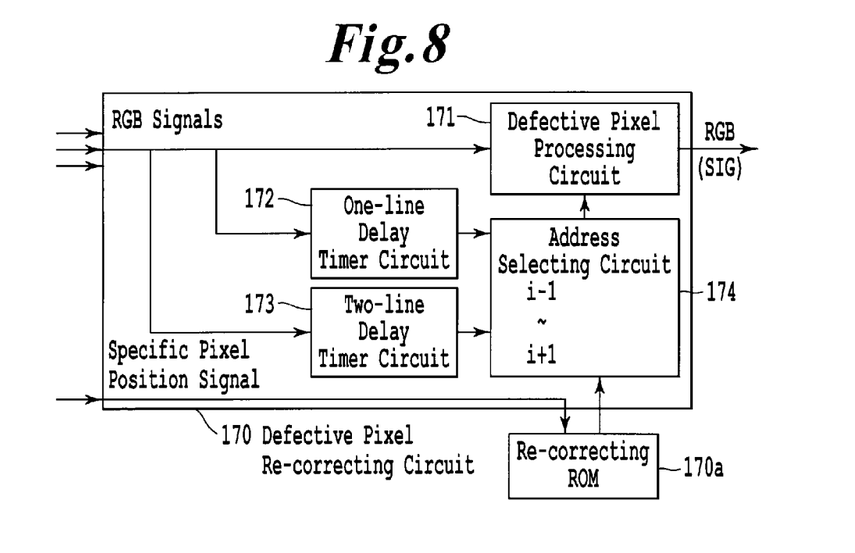
FIG. 8 is a block diagram for explaining a defective pixel re-correcting circuit of the image reader of the embodiment 2 in accordance with the present invention.

FIG. 8 is a block diagram illustrating the defective pixel re-correcting circuit 170 for applying the re-correction processing to the defective pixel detected by the defective pixel detecting circuit 16 of the image reader of the embodiment 2 in accordance with the present invention. As for the three-line RGB image signals output from the white correcting section 15, using temporary estimation means 1 and temporary estimation means 2, a defective pixel processing circuit 171 of the defective pixel re-correcting circuit 170 processes the pixel position data at adjacent or neighboring positions of the defective pixel data according to the defective pixel position data in the re-correction ROM 170a, and delivers the three-line RGB image signals to the main system or the like as one-line successively output signal (SIG).

The defective pixel processing circuit 171 and an address selecting circuit 174 are provided for expanding the position range of the pixel to be corrected in accordance with the defective pixel position data in the re-correction ROM 170a. The defective pixel re-correcting circuit 170 performs processing based on the pixel position data of the address selecting circuit 174. In addition, the processing is performed in conjunction with the clock signal (CLK) of the signal processing IC 12, and is performed during one scanning period interval determined by the start signal (SI). The output value of the specific pixel is replaced by the new output value.

Incidentally, although the embodiment 2 comprises the address selecting circuit 174, it can perform the same processing by software by providing the defective pixel processing circuit 171 with an address expansion instruction for expanding the pixel position range directly from the CPU instead of the address selecting circuit 174. As for line delay timer circuits 172 and 173, they can be provided in advance in the defective pixel processing circuit 171 or in a region of other signal processing circuit portion.

In addition, as for the output sequence of the specific pixel, when the CLK speed operating together with the image signal (SIG) is high, it is not necessarily a line successively output signal, but can be output, as long as within that line, after the finally readout pixel, and the main system can convert to the successively output signal.

As described above, according to the image reader of the embodiment 2 in accordance with the present invention, since it delays with the timer circuits 172 and 173 the output values resulting from the photoelectric conversion of the lines of the photodetectors at positions separated apart from the center of the optical axis line with respect to the photodetectors on the optical axis of the lens body 9, it can increase the degree of correlation of the correction and to implement more accurate image reader than that described in the embodiment 1.

Incidentally, in the embodiments 1 and 2, although the pixel detecting circuit 16 is described separately from the pixel correcting circuit 17 or 170, the pixel detecting circuit 16 can be combined with the pixel correcting circuit 17 or 170. More specifically, although the pixel detecting circuit 16 receives part of the output of the A/D converter section 13 and supplies its output to the pixel correcting circuit 17 or 170 without via the black correcting section 14 or white correcting section 15, when it is obvious that the defective pixel is an output with ON (saturation output or GND output) or OFF (GND output or saturation output), since the output, even if it passes through the white/black correction via the black correcting section 14 and white correcting section 15, can cope with the decision of the defective pixel by finely setting the threshold range of the defective pixel, the pixel detecting circuit 16 can be integrated into the pixel correcting circuit 17 or 170.

In the embodiment 1 and 2, although examples are chiefly described which have a defect in one pixel in the R line among three (three-color) pixel lines having filters with different wavelengths, the estimation of the output value of the defective pixel can be achieved by the same means when the G line or B line has a defect in one pixel.

In the embodiments 1 and 2, although examples are shown which have three (three-color) pixel lines having filters with different wavelengths, the same means is easily applicable to the case of two lines or four or more lines. In addition, although the description is made of the photodetectors employing red, green and blue color filters, photodetectors having filters with different optical wavelengths can also be used. As for the photodetectors, they can be composed of filters passing prescribed wavelengths or filters absorbing (rejecting) prescribed wavelengths. In addition, although the pixel lines are arranged at the same pitch, the embodiments are applicable to the case where pixels at edges are disposed irregularly.

What is claimed is:

1. An image reader comprising:
   a sensor substrate having photodetectors with filters which are disposed in a plurality of lines with different wavelengths in a conveyance direction of an illuminated body to be conveyed, the photodetectors being disposed at a substantially equal pitch in a read width direction linearly for the respective photodetectors with the filters of the same wavelength;

a pixel detecting circuit for measuring photoelectric conversion output values of the photodetectors by setting a desired threshold range, for specifying a photodetector with a photoelectric conversion output value less than the desired threshold range, and for detecting a pixel position of the specific photodetector;

a pixel correcting circuit for generating a corrected output value by calculating output value data corresponding to the pixel position of the photodetector specified by the pixel detecting circuit, and for passing photoelectric conversion output signals of the photodetectors;

first calculation means for calculating an output value from the photoelectric conversion output value of a photodetector adjacent to the specific photodetector in the read width direction; and second calculation means for calculating a ratio between a first value and a second value, the first value being an output value of the photodetector disposed in the conveyance direction with respect to the specific photodetector, and the second value being a photoelectric conversion output value of a photodetector adjacent, in the read width direction, to the photodetector disposed in the conveyance direction with respect to the specific photodetector, wherein the pixel correcting circuit multiplies the values obtained by the first calculation means and the second calculation means, substitutes the product for the output value at the pixel position of the photodetector specified by the pixel detecting circuit, and outputs, as a line output, the substitute together with output values at pixel positions of the photodetectors not specified by the pixel detecting circuit.

2. The image reader according to claim 1, further comprising:

a lens body disposed between the sensor substrate and an illuminated body for converging light from the illuminated body, the lens body having an optical axis along a read width for causing the converged light to form an image on the photodetectors.

3. The image reader according to claim 2, wherein one of the lines of the photodetectors, which has the filters of the same wavelength, is disposed on the center of the optical axis line of the lens body;

output values after photoelectric conversion of another line of the photodetectors separated from the center of the optical axis line are delayed on a read-line-period basis by a timer circuit; and the first calculation means and the second calculation means use the output values after photoelectric conversion of the another line of the photodetectors separated from the center of the optical axis line.

4. An image reader comprising:

a sensor substrate having photodetectors with filters which are disposed in a plurality of lines with different wavelengths in a conveyance direction of an illuminated body to be conveyed, the photodetectors being disposed at a substantially equal pitch in a read width direction linearly for the respective photodetectors with the filters of the same wavelength;

a pixel detecting circuit for measuring photoelectric conversion output values of the photodetectors by setting a desired threshold range, for specifying a photodetector with a photoelectric conversion output value less than the desired threshold range, and for detecting a pixel position of the specific photodetector;

a pixel correcting circuit for generating a corrected output value by calculating output value data corresponding to the pixel position of the photodetector specified by the pixel detecting circuit, and for passing photoelectric conversion output signals of the photodetectors;

first calculation means for calculating an output value from a value referring to photoelectric conversion output values of the photodetectors on both sides adjacent to the specific photodetector in the read width direction; and second calculation means for calculating a ratio between a first value and a second value, the first value being a value referring to an output value of the photodetector disposed in the conveyance direction with respect to the specific photodetector, and the second value being a value referring to photoelectric conversion output values of the photodetectors on both sides adjacent, in the read width direction, to the photodetector disposed in the conveyance direction with respect to the specific photodetector, wherein the pixel correcting circuit multiplies the values obtained by the first calculation means and the second calculation means, substitutes the product for the output value at the pixel position of the photodetector specified by the pixel detecting circuit, and outputs, as a line output, the substitute together with output values at pixel positions of the photodetectors not specified by the pixel detecting circuit.

5. The image reader according to claim 4, wherein the first calculation means and the second calculation means are means for averaging the photoelectric conversion output values of the photodetectors on both sides, respectively.

6. The image reader according to claim 4, further comprising:

a lens body disposed between the sensor substrate and an illuminated body for converging light from the illuminated body, the lens body having an optical axis along a read width for causing the converged light to form an image on the photodetectors.

7. The image reader according to claim 6, wherein one of the lines of the photodetectors, which has the filters of the same wavelength, is disposed on the center of the optical axis line of the lens body;

output values after photoelectric conversion of another line of the photodetectors separated from the center of the optical axis line are delayed on a read-line-period basis by a timer circuit; and the first calculation means and the second calculation means use the output values after photoelectric conversion of the another line of the photodetectors separated from the center of the optical axis line.

8. The image reader according to claim 7, wherein the first calculation means and the second calculation means are means for averaging the photoelectric conversion output values of the photodetectors on both sides, respectively.

9. The image reader according to claim 6, wherein the first calculation means and the second calculation means are means for averaging the photoelectric conversion output values of the photodetectors on both sides, respectively.

* * * * *